United States Patent Office 2,836,099
Patented May 27, 1958

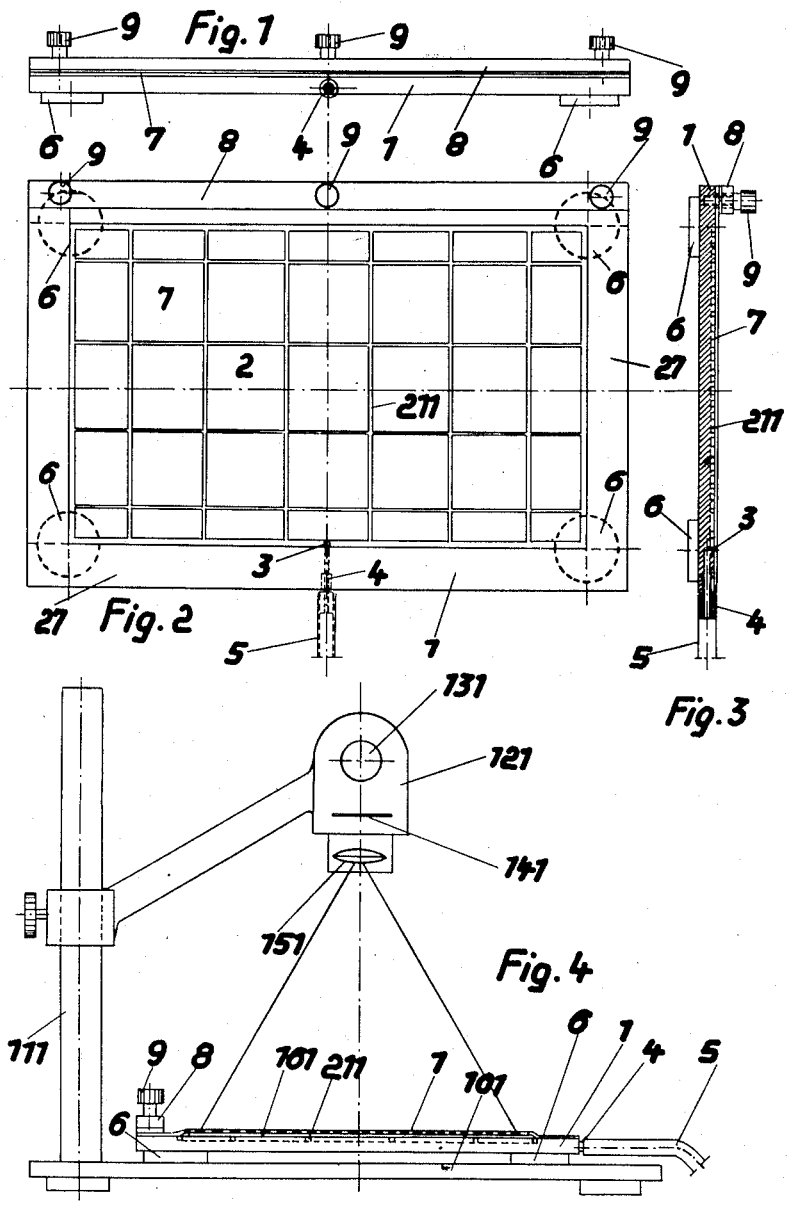

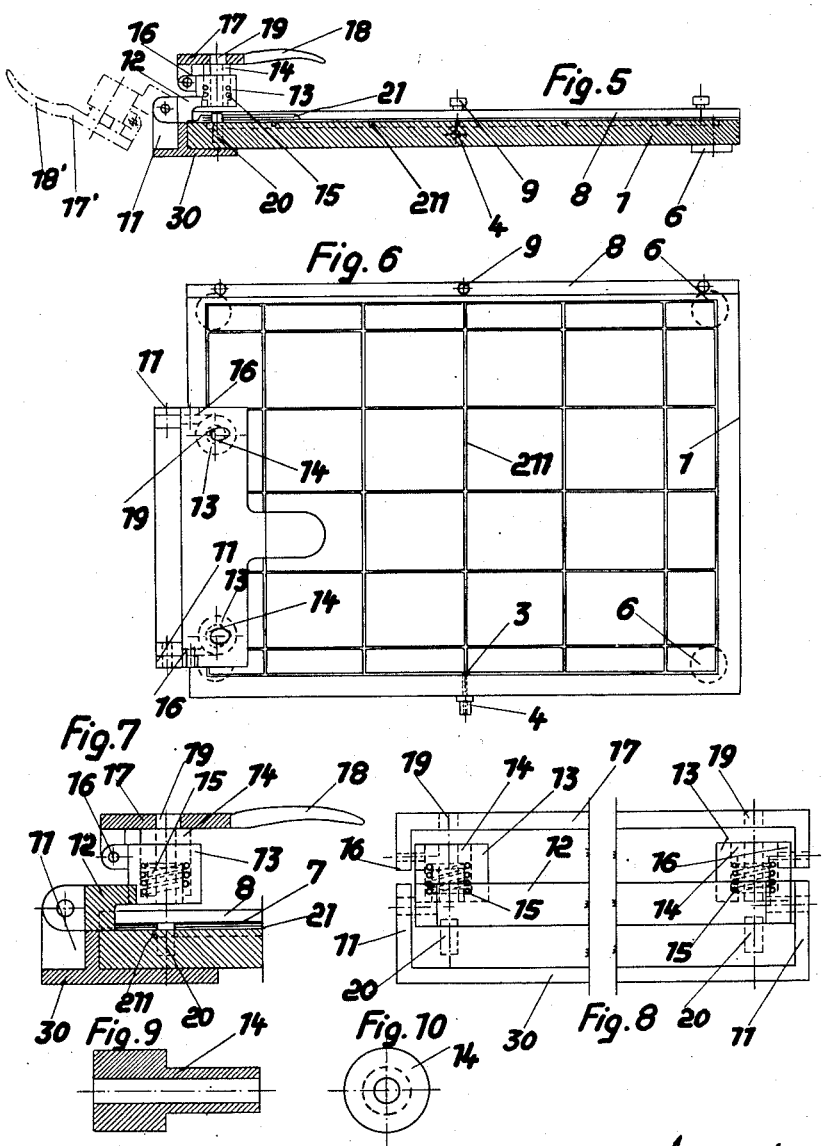

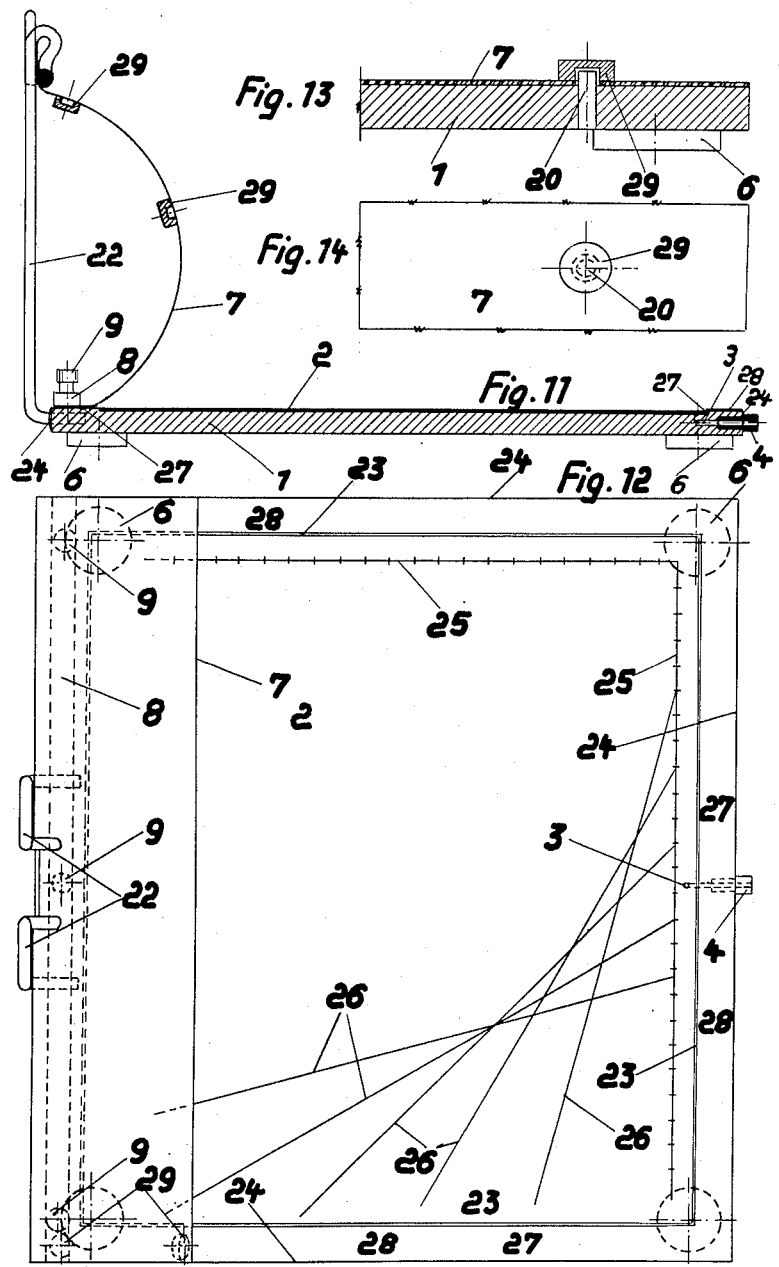

2,836,099

COPYING DEVICE FOR PHOTOGRAPHIC WORK

Paul Weishaupt, Oberburg, Burgdorf, Switzerland

Application October 12, 1954, Serial No. 461,807

Claims priority, application Switzerland February 26, 1954

1 Claim. (Cl. 88—24)

The invention relates to a copying device for photographic work. In devices of this kind especially of greater size the negative is pressed upon the sensitized paper by air pressure. Such devices are only fit for direct copying or direct screening as the thickness of their glass plates causes uncontrollable light refraction.

The aforesaid limited application is considerably eliminated by the present invention, as direct screening below a magnifying apparatus, not having been possible till now, is now made possible and moreover directly screened clear extract positives or negatives can be made with the aid of a white-black contact screen in each desired enlargement or reduction.

It is, therefore, one object of the present invention to provide a copying device in which a transparent refraction-free thin film sheet instead of a glass plate is applied, which film sheet is pressed against the bearing surface of the copying device by air suction, after the sensitized photo material to be treated has been laid between. Whilst known copying devices use a transparent solid glass plate and a non-transparent rubber mat, the present invention proceeds in the opposite direction. Here the solid bearing plate is non-transparent and the flexible cover sheet (clear film sheet) is transparent.

It is another object of the present invention to provide a copying device which can be charged in upright position and exposed without change of position if incident light comes from above, whilst corresponding known devices preponderantly can only be charged in opposite position and have to be turned around before exposure.

It is still another object of the present invention to provide a copying device which comprises a solid bearing plate for the photo material, a flexible transparent cover sheet disposed above the latter and an exhausting device for air suction from the space between the cover sheet and the bearing plate. In order to spare a special cover sheet when screening or enlarging, a contact screen can be used as cover sheet. The bearing plate is furnished with a net of engraved grooves which can be connected with the exhausting device.

It is yet another object of the present invention to provide a copying device in which alternatively the bearing plate for the photo material can be furnished with a roundabout smooth border, upon which the cover sheet also is leaning instead of the net of grooves which at over exposure might copy through. The working area enclosed by said smooth border is roughened and in connection with the exhausting device.

It is still a further object of the present invention to provide a copying device in which the vacuum production can be sped up by bringing up on the smooth border of the bearing plate or on the inner edge of the frameless cover sheet a packing medium with lasting adhesion for instance non drying clear varnish.

It is also another object of the present invention to provide a copying device in which the working area of the copying device is furnished with a system of right angled coordinates and a number of differently inclined base lines in order to be able to bring in the photo material on predetermined places of the working area, or when screening colour extract half tone negatives, to place the screen under the proper angle necessary for different colour tints.

Simultaneously it is possible by this arrangement to bring the base line of the picture projection into coincidence with the inclined base line as desired by simply turning the device.

Furthermore the working area of the device is demarcated by a luminous colour frame line and the faces of the bearing plate are also coated with a luminous colour. By this the outlines of the device as well as the contour of the working area are distinctly visible during manipulation in the dark room.

It is yet a still further object of the present invention to provide a copying device which affords a further great field of application of the device by the attachment of a so-called corrective adjusting device in form of a punching apparatus for the photo material, directly connected with the bearing plate and in correspondence with pins for the material to be punched and adjusted, said pins also sitting on the bearing plate. By this a deficiency is met with, which up to now arose with the manufacture of mask negatives or depth negatives etc. (correctives). Till now adjustment has been practised with the aid of adjusting crosses. This is most difficult and the adjusted photo material moreover was apt to shift.

Preferably the pins of the bearing plate are arranged within the reach of the punching device, that they simultaneously form the punching pins of the latter. The whole device is carried by hinges, arranged on the edge of the bearing plate so that it can be swung out when not used. One can work therefore with or without the punching device according to the requirements.

It is also one of the objects of the present invention to provide a copying device which permits additional working by a sheet holder securing the cover sheet in its lifted up position. If the device is used together with the corrective adjusting device and a punched sheet being used as cover sheet, the punching out holes of the sheet are covered by caps of caoutchouc or the like and air tightly so that at any time the vacuum, necessary for pressing the photo material, is secured.

With these and other objects in view which will become apparent in the following detailed description, the present invention will be clearly understood in connection with the accompanying drawings, in which:

Figure 1 is an elevational view of the copying device;
Fig. 2 is a plan view;
Fig. 3 is a sectional view;
Fig. 4 is an elevational view of the copying device below a magnifying apparatus in order to show the special applicability for the direct production of the enlarged copies, whereby the flexible transparent part simultaneously is finished in form of a screen;
Fig. 5 is a sectional view of another embodiment of the device;
Fig. 6 is a plan view of the embodiment shown in Fig. 5;
Fig. 7 is a sectional view of the punching device in larger scale;
Fig. 8 is a front view of the punching device;
Figs. 9 and 10 are single parts of the punching device in larger scale;
Figs. 11 and 12 are a sectional view and a plan view of another embodiment of the device; and
Figs. 13 and 14 are a sectional view and a plan view of a detail of the device in larger scale.

Referring now to the drawings and in particular to Figs. 1 to 4, the bearing plate 1 of the device has supporting pads 6 and on its upper side the working area 2, surrounded by the smooth border 27. Said area is connected over bore 3 and nipple 4 with a hose 5 leading to an exhausting device. At one longitudinal edge of plate 1 the flexible framefree cover sheet 7 is fixed thereto by the ledge 8 and the screws 9. Said cover sheet 7 is made from a transparent refraction free clear film sheet preferably made from conventional artificial film material. According to the work to be carried out a clear film sheet or a screened sheet or a colour tint sheet can be used. The sheet can be exchanged at any time.

According to Fig. 4 the copying device is put on the bed plate 101 of a magnifying apparatus comprising a bearing column 111, magnifying camera 121, light source 131, negative 141 which enlarged has to be copied and objective 151. Upon the working area 2 lies the photographic material 161 with its sensitized layer upwards.

The smooth border 27 enclosing the working area 2 can be even with this area or rise above same by a little. The working area itself is roughened, so that vacuum can extend over the whole area 2. In the embodiment according to Figs. 1–6 the area 2 bears a net of grooves 211. In the embodiment according to Figs. 11 and 12 there is no net of grooves however.

Preferably the bearing plate 1 has a roundabout recess, rill or groove between the working area 2 and border 27 as well. This is replaced in the embodiment according to Figs. 11 and 12 by a bright colour frame. Likewise the end faces of the bearing plate 1 can be provided with a coating 24 of luminous colour. Tightening of the cover sheet 7 upon the border 27 can be improved by providing a packing medium as for instance a non drying clear varnish 28.

In the embodiment disclosed in Fig. 12 a system of right angled coordinates 25 is spread over the whole working area 2, whereby the exact net of lines has not been drawn in because of clearer representation. Besides there is provision made for the inclined base lines 26 which on the working area 2 are necessary for colour screening. The photo material can thereby be brought upon the working area 2 in each desired position, predeterminable by the net of lines. Furthermore a cover sheet holder 22 is fixed to the plate 1 by which the cover sheet 7 can be held in lifted up position (Figs. 11 and 12). Further the predescribed copying device can be fitted with a so-called corrective adjusting device in the form of a punching and adjusting apparatus for the photo material as shown in Figs. 5–10.

On the bearing plate 1 the carrier 10 is fixed laterally. In this a punching ledge 12 is built in, swivelling between the bearings 11 and carrying the exact punching arrangement. In the sockets 13 of ledge 12 the punches 14 are guided, whereby pressure springs 15 are set between the bottom of sockets 13 and the enlarged upper part of the punches 14, said springs lifting them up. On the ends of the punching ledge 12 side bearings and bolts 16 are provided around which the stamping ledge 17 with its handle 18 can be swung. This ledge has ejecting holes 19 above the punches 14 through which the punched out material can escape. The whole punching device can be swung out according to position 17', 18' as shown in Fig. 5 in dotted lines.

Beneath the punches 14 are sitting the pins 20 immediately in the bearing plate 1, said pins entering at each punching the bores of the punches 14 as far as they project from the bearing plate 1. The punched sensitized films are marked 21. As the cover sheet thereby also must have holes in order to permit movement of the punches 20, it is necessary to cover over these holes airtightly by caps 29 made from caoutchouc or the like, fixed on the upper side of the sheet 7 (Figs. 11 and 12).

The device designed in accordance with the present invention is operated as follows: Depending upon the kind of copywork, whether enlarged or reduced, screened or not screened, either the photo material (always with its sensitized layer upwards) and negative, or photo material, contact screen and negative or photo material and contact screen are to be laid beneath the cover sheet 7 upon the working area 2 of the bearing plate 1. After switching on the exhausting device (pump, ejector or the like) air is sucked off the space between the cover sheet 7 and the working area 2 by means of the hose 5, bore 3 and nipple 4, whereby the cover sheet 7 is pressed tightly upon the border 27 surrounding the working area 2.

By outer air pressure or vacuum originated in the net of grooves 211 or above the roughened working area 2 the cover sheet 7 and the applied photo material will be pressed against the bearing plate 1 and thus a very tight contact is created, which is necessary for the production of clear and sharp copies.

When the copying device designed in accordance with the invention is used for the production of enlarged copies, it is mounted on the bed plate 101 (Fig. 4) of the magnifying camera 121, which is vertically movable along the column 111, and the negative 141 is placed in position in the camera 121. The photo material 161 with its sensitized layer upwards is laid beneath the cover sheet 7, which in the case of screened copies can be a screen itself and which after loosening the screws 9 and after removal of the ledge 8 can be exchanged once more for a clear cover sheet 7.

The system of right angle coordinates in millimeters or inches or the like, as disclosed in the embodiment shown in Figs. 11 and 12 gives the possibility of putting the photo material on exact predetermined places of the working area. The differently inclined base lines 26, starting from the system of coordinates, on the one hand do enable one to immediate finding of the proper screen positions, which are necessary for the different colour tints at screening of colour extract half tone negatives and on the other hand provide the possibility to bring the base lines of the picture projection into coincidence with the proper inclined base lines 26 by simply turning the device. The frame line 23 made of luminous colour and the luminous color coating of the faces 24 of the bearing plate make the outlines of the working area 2 as well as the contour of the device distinctly visible during manipulation in the darkroom. The sheet holder 22 made in the shape of a wire suspension loop or the like holds the lifted up frameless cover sheet 7 during work on the bearing plate in a position enabling quick reapplication and protects the sheet from damage simultaneously. The caps 29 as shown in Figs. 11–14, provide airtight coverage of the punched out holes in the cover sheet 7, said holes permitting penetration of the punching pins 20 of the corrective adjusting device according to the invention, and also secure the vacuum formation underneath the punched cover sheet 7.

If the copying device is equipped with the so-called corrective adjusting device, disclosed in Figs. 5–10, this can be handled as follows: After the punching apparatus has been swung into its lifted position 17', 18' (Fig. 5), the cover sheet, which in this example is made in the form of a clear film sheet, can be lifted up. The necessary photo material 21 is disposed on the punching pins 20 just like the basic negative is provided later on. After the punching apparatus 14, 17, 18 is swung back into its operative position the photo material 21 is punched. Then after bringing the punching apparatus into its inoperative position 17', 18' again, the cover sheet 7 is spread over the punching pins 20 with its punched out holes, covered over by caps 29, air is sucked off as predescribed and the photo material 21 exposed. After removal of the cover sheet 7 and after the basic negative has been taken off the exposed photo material 21 is also taken off and developed. After development and drying of the photo material 21 further sensitized material once more is punched in the predescribed manner and fixed with the aid of punching pins 20.

The already punched basic negative as well as the punched mask negative (photo material 21) are disposed on this new sensitized material by means of the precision punching pins 20 and whilst automatically fitting to each other exactly, they are copied under vacuum as described before. In spite of taking off and replacing upon the punching pins 20, the most exact fitting of the basic negative and of the masks (photo material 21) is secured by the precise punching as described before.

While I have disclosed several embodiments of the present invention, it is to be understood that these embodiments are given by example only and not in a limiting sense, the scope of the present invention being determined by the objects and the claim.

I claim:

A copying device for photographic work comprising a bearing plate having a central working area and a peripheral border area, said working area having a roughened surface in the shape of channels engraved therein, a peripheral air suction channel disposed between said working area and said border area, an air exhausting device connected to said engraved channels and to said peripheral channel, and a lid consisting of a transparent frameless film sheet covering said bearing plate, means provided on said bearing plate for punching the photomaterial, said means comprising punching pins fixed to said bearing plate, a carrier and a stamping ledge connected with said carrier, said stamping ledge provided with sockets in which punches corresponding with said punching pins are guided, springs lifting up said punches, and side bearings and bolts extending therethrough to operate as pivots for said stamping ledge, adapted to be turned by a handle, said transparent frameless film sheet having a plurality of holes complementary to the arrangement of said punching pins, and caps of resilient material disposed over said respective holes of said lid, in order to render the device airtight.

References Cited in the file of this patent

UNITED STATES PATENTS

| | | |
|---|---|---|
| 1,778,027 | Herriott | Oct. 14, 1930 |
| 2,000,390 | Huebner | May 7, 1935 |
| 2,122,474 | Karl | July 5, 1938 |
| 2,366,722 | Gaebel | Jan. 9, 1945 |
| 2,408,310 | Hassler | Sept. 24, 1946 |
| 2,436,085 | Amering | Feb. 17, 1948 |
| 2,498,417 | Haff | Feb. 21, 1950 |
| 2,645,153 | Halpern | July 14, 1953 |
| 2,652,757 | Robbins | Sept. 22, 1953 |
| 2,711,670 | Clarke | June 28, 1955 |
| 2,774,289 | Collins | Dec. 18, 1956 |